Sept. 16, 1930.  L. H. WELLENSIEK  1,775,920
CORE CATCHER FOR WELL DRILLS
Filed Nov. 7, 1927

Louis H. Wellensiek INVENTOR
BY Jesse R. Stone
ATTORNEY

Patented Sept. 16, 1930

1,775,920

UNITED STATES PATENT OFFICE

LOUIS H. WELLENSIEK, OF HOUSTON, TEXAS, ASSIGNOR TO HUGHES TOOL COMPANY, OF HOUSTON, TEXAS, A CORPORATION OF TEXAS

CORE CATCHER FOR WELL DRILLS

Application filed November 7, 1927. Serial No. 231,700.

My invention relates to core catching devices employed in engaging and retaining the cores cut by deep well core drills.

It is an object of the invention to provide a core catcher which will normally remain in elevated position out of gripping engagement with the core, but which will be adapted to move downwardly and engage the core when the drill is drawn upwardly from the bottom of the well.

It is desired to retain the core gripping jaws resiliently connected with a supporting housing which may move downwardly with the jaws, and to provide core engaging means to control the position of the housing, but which will not mar or injure the core passing therethrough.

Figure 1:
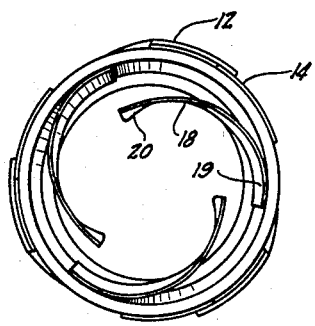
Figure 2:
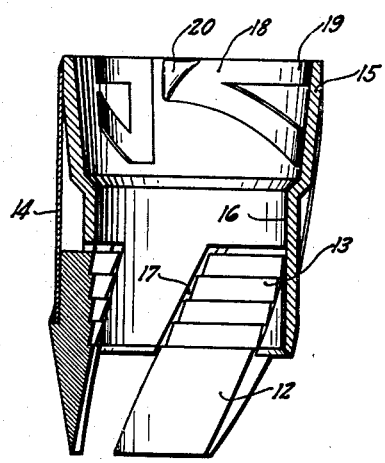
Figure 3:
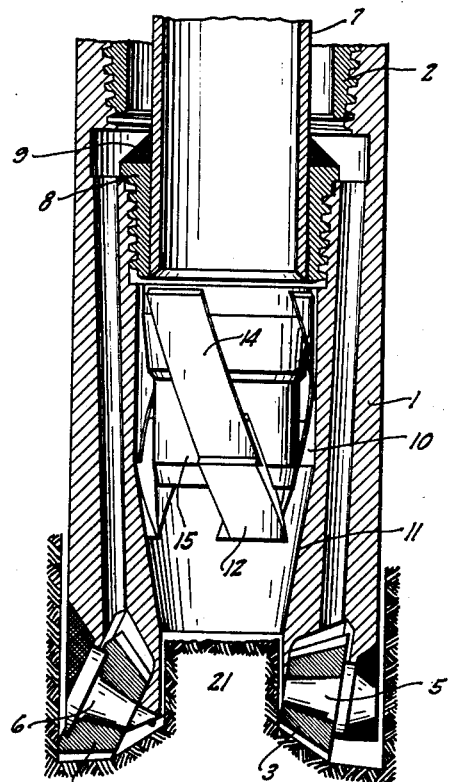

The device is adapted to be employed with a rotary drill and reference is made to the drawing for a better understanding thereof. Fig. 1 is a top plan view of the device. Fig. 2 is a central longitudinal section through the same. Fig. 3 is a longitudinal section through a core drill with my invention mounted therein, said core catcher being in side elevation.

The core catcher is adapted to be used with any ordinary type of core drill, and in Fig. 3 I have shown a roller core drill having a tubular head 1, having an upper threaded engagement with a drill collar 2. The forward end has sets of rolling cutters 3 and 4 thereon mounted on inclined shafts 5 and 6 respectively; to cut an annular hole in the formation.

A core barrel 7 is formed with a coupling head 8 thereon, said head being welded at 9 to said barrel. Said coupling has threaded engagement with the inner upper end of the drill head.

Below the core barrel the interior chamber 10 is cylindrical, but the lower area is tapered at 11 to form a seat for the core engaging slips 12.

The slips 12 are jaws toothed on their inner faces 13 to engage the core, the upper teeth being of greater depth than the lower ones. The outer faces of the jaws are tapered downwardly to fit the seat 12. The sides of the jaws are inclined or spiralled rearwardly from the direction of rotation of the drill so as to avoid injuring the slips or the core in normal operation.

The jaws are supported upon arms 14 of spring steel, welded at their lower end within recesses in the upper ends of the jaws and similarly secured to the outer upper end of a housing 15. The arms 14 are spiralled or inclined in the same direction as are the jaws.

The housing 15 is of largest outer circumference at its upper end, to which the spring arms 14 are welded. The large upper end is slightly tapered downwardly to allow play for the jaws. The lower end 16 is cylindrical and has openings 17 cut therein to allow the toothed faces of the jaws 12 to project therethrough.

Within the upper end of the housing are spring fingers 18 secured by welding, or otherwise, to the inner wall thereof. Said fingers are extended approximately horizontally about the casing, but the outer end is inclined inwardly and a head 20 is formed thereon. Said head being of hard steel resistant to abrasion. The inner ends 19 of the fingers are held securely to the housing. As seen in Fig. 1, I employ three of these fingers altho any desired number may be employed.

In operation of the drill, a core, indicated at 21, is formed and as the drill is operated the core projects progressively higher in the drill and core barrel. The spring fingers 18 engage the core and the frictional contact between them holds the housing and jaws 12 in an elevated position out of the seat 11. The drill is rotated in a clockwise direction, as seen from above in Fig. 1. The fingers 18 therefore slip on the core without injuring the core in any way.

When the drill is raised, the housing is moved relatively downward by the engagement of the fingers with the core. The slips 12 are thus carried into the seat 11 and are forced inwardly to grip the core and hold it securely so that it may be broken off and carried with the drill to the surface.

The advantages of this construction are that the core is not injured by the contact of the jaws therewith during the drilling operation. The spring fingers 18 are not strong enough to injure the core, but are sufficient, because of their position and shape, to engage the core when the drill is raised to throw the jaws into operative position. This tool will not wear quickly and will grip the core in an effective manner.

What I claim as new is:

1. A core catcher for core drills comprising a holding member adapted to fit the interior of the drill, a plurality of core engaging jaws secured rigidly thereto and resiliently depending from said member, said member having openings through which said jaws project, and means on said member to resiliently engage the core.

2. A core catcher comprising a holder, core engaging jaws thereon, and spring fingers on said holder extending rearwardly from the direction of rotation and inwardly to engage the core and control the position of said holder and jaws.

3. A core catcher comprising a holder, spring arms depending from said holder, core engaging jaws on said arms, and spring fingers extending rearwardly from the direction of rotation and inwardly from said holder and adapted to engage the core and control the position of said holder.

4. A core catcher for core drills, comprising a holder, flexible arms on said holder and core gripping jaws on said arms, said jaws being inclined rearwardly from the direction of rotation of the drill.

5. In combination, a core drill having an inner chamber and a tapered seat below said chamber, with a holder in said chamber, core engaging jaws depending from said holder, the outer faces of said jaws tapered to fit said seat, the forward and rearward sides of said jaws being inclined rearwardly from the direction of rotation of the drill, and spring fingers secured in approximately horizontal position in said holder for the purpose described.

In testimony whereof I hereunto affix my signature this 3d day of November A. D. 1927.

LOUIS H. WELLENSIEK.